UNITED STATES PATENT OFFICE 2,679,483

PROCESS OF PREPARING A HYDROGEN PEROXIDE BLEACH

Thomas J. Armstrong, Chadds Ford, Pa., and Ralph K. Iler, Wilmington, Del., assignors to E. I. du Pont de Nemours & Company, Wilmington, Del., a corporation of Delaware No Drawing. Application October 26, 1951, Serial No. 253,461

1 Claim. (Cl. 252—186)

This invention relates to peroxide bleaching baths and is more specifically directed to processes for preparing a depolymerized solution of sodium silicate to be used as a stabilizer and promoter in hydrogen peroxide baths.

Sodium silicate has been widely used in peroxide baths. The results have been unexplainably erratic. It has been the practice to add sodium hydroxide to a solution of sodium silicate having a comparatively high ratio, such as one having an $SiO_2:Na_2O$ weight ratio of 3.25:1. By the addition of sodium hydroxide a silicate solution of lower ratio is obtained. The mixtures thus made are quite dilute and they are added to peroxide to make a bleaching solution. Following such practices, precipitates form in the bleaching solution and silicate is deposited on the equipment.

We have found that a sodium silicate solution can be prepared which is uniformly and highly effective and which will cause fewer difficulties than silicate solutions made heretofore. According to the invention a silicate solution and caustic are mixed under such conditions as to bring about a more complete reaction of the ingredients and to effect a substantially complete depolymerization of the silicate to the ionic form. This is done by limiting the amount of water so that a temperature above about 60° C. is obtained, because of heat of dilution of the caustic and the heat of reaction. The concentrated solution of depolymerized silica is then suitably diluted and used in accordance with prior art practices.

The sodium silicate mixed with sodium hydroxide according to processes of the invention has a higher ratio of $SiO_2:Na_2O$ than the silicate ratio which is desired in the final solution. Ordinarily the weight ratio of $SiO_2:Na_2O$ in the final solution will be between about 1.4:1 and 1.8:1. More narrowly it is preferred to use a ratio between about 1.6:1 and 1.8:1.

The sodium silicate used as a starting material will ordinarily have a ratio above about 2:1. In commercial practice it will usually be preferred to use a sodium silicate with a ratio from about 2.25:1 to 3.75:1. The silicate solution should not be too dilute and ordinarily it will contain enough sodium silicate so that the $SiO_2$ content is at least 5 per cent.

The sodium hydroxide will, of course, be used in an amount to give the desired final $SiO_2:Na_2O$ ratio with the particular silicate selected as a starting material. The sodium hydroxide will ordinarily be added as a concentrated solution and preferably one containing at least 50 per cent NaOH. Concentration of the solution is limited only by the solubility of sodium hydroxide, and apart from the inconvenience it is entirely possible to use a suspension of sodium hydroxide or even finely divided dry sodium hydroxide.

The addition of a concentrated sodium hydroxide solution to a sodium silicate solution, according to processes of the invention, results in an exothermic reaction and the temperature of the mixture rises. It is desired that the temperature rise to above 60° C. The amount of water present must be limited so that this temperature can be reached. It will be understood that the amount of water is the total, including both that containing sodium hydroxide and that containing the sodium silicate. If the sodium hydroxide is very concentrated the sodium silicate can be somewhat more dilute. Conversely, if the sodium silicate solution is quite concentrated, the sodium hydroxide solution can be somewhat more dilute.

It will also be evident that the amount of sodium hydroxide required to effect the desired lowering of the ratio will be a factor, since if only a little sodium hydroxide is added the solutions must be quite concentrated to obtain a temperature as high as 60° C.

It will be evident that the initial temperatures of the solutions mixed will have an effect upon the final temperature reached. If the solutions are comparatively cool they will need to be more concentrated under given conditions to attain a suitably high temperature. Ordinarily, for example, if solutions are cold from standing outside in cold weather they should be brought inside and allowed to come to room temperature before mixing. For the purposes of this discussion it is assumed that the solutions are at about normal room temperatures and deviations will require adjustment of other factors as suggested.

After the silicate and sodium hydroxide solutions have been mixed and after the temperature has risen to above 60° C., the mixture should be held and aged at the elevated temperature for some time. Specifically it will be found that the hot mixture should be aged for at least five minutes at about 60° C. At higher temperatures a somewhat shorter time can be used but it will in general be found most practical to age the mixture for at least about five minutes. The mixture may be aged for longer times but it should not be allowed to cool and stand at a low temperature for any great length of time while in the concentrated state.

After the mixture has aged it should then be diluted with water. The water can be present in the peroxide solution but it is ordinarily preferred to add at least about 5 to 10 per cent of water to the mixture before adding it to the peroxide. Larger amounts of water can also be added at this point to bring the silicate solution to the strength of silicate solutions normally mixed with peroxide in forming bleaching baths.

In order that the invention may be better understood reference should be had to the following illustrative example:

Example

Eighty pounds of an aqueous solution of sodium silicate having a gravity of 42° Baumé, and having a weight ratio of $SiO_2/Na_2O$ of 2.55, is placed in a small pre-mix tank. Then 15 pounds of a strong solution of sodium hydroxide containing 50% by weight of NaOH, is added to the sodium silicate solution and the mixture is agitated. An exothermic reaction takes place, the temperature of the mixture rising from a room temperature of about 20° C. to 70° C. The final weight ratio obtained was 1.52:1. The mixture is permitted to stand for at least 5 minutes, in order to permit the chemical reaction of the sodium hydroxide with the sodium silicate to proceed essentially to completion. At this point, the mixture may be used directly to make up a dilute solution of hydrogen peroxide by adding 500 gallons of water to the mixture, and then adding 108 pounds of 30 per cent hydrogen peroxide.

On the other hand, if it is desired to hold the silicate-caustic mixture so that it can subsequently be used a little at a time, the mixture is diluted with at least 5 per cent by weight of water, in order to prevent the formation of crystalline hydrated sodium metasilicate, especially when the solution is cooled. However, the dilution of this mixture with water is purely a matter of convenience to prevent the formation of a precipitate in the mixture during storage, and is not a necessary intermediate step in the invention.

We claim:

In a process for preparing a hydrogen peroxide bleach, the steps comprising mixing a sodium hydroxide solution which contains at least 50 per cent NaOH with a sodium silicate solution having a ratio of $SiO_2:Na_2O$ from 2.25:1 to 3.75:1 and containing at least 5 per cent $SiO_2$ the proportions of sodium hydroxide and silicate being such as to produce a sodium silicate having an $SiO_2:Na_2O$ weight ratio from 1.6:1 to 1.8:1 the amount of water being so limited that the temperature of the mixture rises to over 60° C., aging the mixture for at least five minutes, diluting with at least 10 per cent of water, and mixing with hydrogen peroxide.

References Cited in the file of this patent

UNITED STATES PATENTS

| Number | Name | Date |
| --- | --- | --- |
| 2,116,423 | Baker | May 3, 1938 |